United States Patent [19]

Chu et al.

[11] Patent Number: 5,348,986
[45] Date of Patent: Sep. 20, 1994

[54] PHOTOCURABLE SILICONE COMPOSITION, AND METHOD OF MAKING SAME

[75] Inventors: Hsien-Kun Chu, Wethersfield; Robert P. Cross, West Simsbury; David I. Crossan, Hebron; Edward K. Welch, II, Bristol, all of Conn.

[73] Assignee: Loctite Corporation, Hartford, Conn.

[21] Appl. No.: 7,946

[22] Filed: Jan. 25, 1993

Related U.S. Application Data

[63] Continuation-in-part of Ser. No. 615,185, Nov. 19, 1990, Pat. No. 5,212,211, and Ser. No. 615,186, Nov. 19, 1990, Pat. No. 5,182,315.

[51] Int. Cl.$^5$ .............. C08F 2/50; C08G 77/20; C08G 77/26
[52] U.S. Cl. .............. 522/37; 522/40; 522/44; 522/46; 522/81; 522/83; 522/99; 524/860; 524/862; 528/32; 528/33
[58] Field of Search .............. 522/99, 37, 40, 44, 522/46, 81, 83; 524/860, 862; 528/32, 33

[56] References Cited

U.S. PATENT DOCUMENTS

| | | | |
|---|---|---|---|
| 3,035,016 | 5/1962 | Bruner | 260/46.5 |
| 3,584,023 | 6/1971 | Ashby | 260/448.2 B |
| 4,503,208 | 3/1985 | Lin et al. | |
| 4,504,629 | 3/1985 | Lien et al. | 525/288 |
| 4,563,539 | 1/1986 | Gornowicz et al. | 556/421 |
| 4,575,545 | 3/1986 | Nakos | 526/242 |
| 4,575,546 | 3/1986 | Klemarczyk et al. | 526/245 |
| 4,665,147 | 5/1987 | Lien et al. | 528/15 |
| 4,675,346 | 6/1987 | Lin et al. | 522/39 |
| 4,699,802 | 10/1987 | Nakos et al. | 522/99 |
| 4,845,259 | 7/1989 | Arai et al. | 556/440 |
| 4,952,711 | 8/1990 | Jacobine et al. | 522/99 |

FOREIGN PATENT DOCUMENTS

| | | |
|---|---|---|
| 1200828 | 11/1986 | European Pat. Off. . |
| 0240162 | 10/1987 | European Pat. Off. . |
| 262806 | 4/1988 | European Pat. Off. . |
| 273565 | 7/1988 | European Pat. Off. . |
| 276986 | 8/1988 | European Pat. Off. . |
| 332400 | 9/1989 | European Pat. Off. . |
| 348106 | 12/1989 | European Pat. Off. . |
| 363071 | 4/1990 | European Pat. Off. . |
| 3708958 | 9/1988 | Fed. Rep. of Germany . |
| 63-10632 | 1/1988 | Japan . |
| 63-117024 | 5/1988 | Japan . |
| 63-179881 | 7/1988 | Japan . |
| 63-185989 | 8/1988 | Japan . |
| 02110121 | 10/1988 | Japan . |
| 0114226 | 1/1989 | Japan . |
| 01279912 | 1/1989 | Japan . |
| 01301708 | 12/1989 | Japan . |
| 01304108 | 12/1989 | Japan . |
| 01318028 | 12/1989 | Japan . |
| 1072889 | 6/1967 | United Kingdom . |

OTHER PUBLICATIONS

"Synthesis of Organosilicon Esters of Hydrazino Carboxylic Acids," Gol'din, G. S., et al, Zhurnal Obshchei Khimii, vol. 43, No. 4, pp. 781–784, Apr. 1973.

*Primary Examiner*—Susan Berman
*Attorney, Agent, or Firm*—Steven J. Hultquist

[57] ABSTRACT

Photocurable silicone compositions based on capping of a silicone with a silyl diacrylate capper of the formula

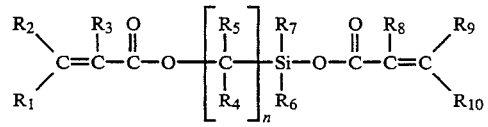

wherein: $R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4.

In specific embodiments, the compositions include a polymodal-cure resin composition comprising an acryloxy-functional capped silicone, and a photocurable silicone gel composition and precursor thereof.

16 Claims, No Drawings

PHOTOCURABLE SILICONE COMPOSITION, AND METHOD OF MAKING SAME

CROSS-REFERENCE TO RELATED APPLICATIONS

This is a continuation-in-part of U.S. application Ser. No. 07/615,185 filed Nov. 19, 1990 and assigned to the assignee hereof, issued May 18, 1993 as U.S. Pat. No. 5,212,211. This application also is a continuation-in-part of U.S. application Ser. No. 07/615,186 filed Nov. 19, 1990 and assigned to the assignee hereof, issued Jan. 26, 1993 as U.S. Pat. No. 5,182,315.

BACKGROUND OF THE INVENTION

1. Field of the Invention

This invention relates generally to a photocurable silicone composition comprising an acryloxy-functional capped silicone, to a polymodal-cure resin composition comprising an acryloxy-functional capped silicone, and to a photocurable silicone gel composition and precursor thereof as well as to methods of making same.

2. Description Of the Related Art

In the field of silicone chemistry, a variety of silicone compounds, polymers, and formulations have been developed for applications including sealants, conformal coatings, potting materials, and the like. Among the numerous silicone compositions have evolved, which depend on atmospheric humidity and/or moisture present on the substrate to which the composition is applied, for their cure. Although such moisturecuring silicone systems provide good physical properties and performance when fully cured, they suffer the disadvantage that the moisture curing process is relatively slow.

In consequence, effort has been focused in recent years on silicone compositions having other curing modalities which are significantly faster than the moisture-curing process. In particular, photocurable (e.g., UV-curable) silicones have been developed which offer a fast curing speed, far superior to conventional moisture-curing silicone.

In one such UV-curing silicone system which has come into wide usage, a photocurable silicone polymer is prepared by reacting (a) an isomeric mixture of acryloxypropenyldimethylchlorosilane, comprising the isomers

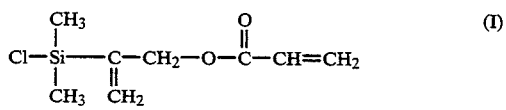

and

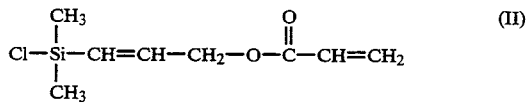

wherein the isomer (I) is present at a concentration of about 75%–80% by weight of the isomeric mixture, and isomer (II) constitutes the balance thereof, with (b) a hydroxyl-terminated dimethylsilicone fluid of suitable molecular weight, e.g., 20,000–40,000 weight average molecular weight, to yield an acrylic-functional capped silicone polymer. The acrylic-functional capped silicone polymer then is compounded with filler, stabilizer, and a suitable photoinitiator such as benzophenone, to yield a photocurable silicone composition which is very rapidly cured upon exposure to UV or other suitable actinic radiation.

The acrylic-functional capper employed to prepare the photocurable silicone polymer described above is typically prepared by selectively hydrosilylating propargyl acrylate at the propargyl group with dimethylchlorosilane. Subsequently, in the endcapping of the hydroxyl-terminated dimethylsilicone fluid using the resulting isomeric mixture described above, hydrogen chloride is generated, necessitating the addition of a basic hydrogen chloride acceptor, e.g., an amine, to the reaction volume. The amine or other acid acceptor functions to prevent the acid from catalyzing the reversion of the dimethylsilicone fluid.

While the above photocurable silicone system functions satisfactorily in many applications and has enjoyed wide commercial usage, it nonetheless suffers from several serious problem.

First, and of utmost importance, propargyl acrylate and its precursor, propargyl alcohol, are highly toxic, and thus require precautionary measures in handling and exposure, to ensure safety in their use.

Second, the process employed to make the acrylic-functional capper is complex and expensive. Propargyl alcohol is first esterified to make the propargyl acrylate, and the acrylate then is carefully hydrosilylated to form the acrylic-functional capper.

Third, the capping process, with a base such as an amine being employed as the hydrogen chloride acceptor, generates a base-complexed hydrochloride which is solid. The formation of this solid complex necessitates the difficult step of filtering the solid from the viscous polymer, which adds to the cost of the process and the photocurable silicone product.

Fourth, the acrylic-functional capper comprises a constituent, viz., the isomer of formula (I) above, which as a β-oxygenated silicon compound, is readily susceptible to undergoing β-elimination reaction. For a discussion of β-elimination chemistry, see C. Eaborn, "Organosilicone Compounds", Butterworths Scientific Publications, London, 1960, pp. 137–138. Thus, the isomer (II) of the capper mixture may undergo β-elimination reaction to split off allene, thereby rendering the acrylic-functional capper unstable. Further, the resulting photocurable silicone composition comprising the photocured acrylic-functional capped silicone polymer may likewise be unstable due to the presence of the β-oxygenated silicon linkage therein.

Apart from the above-described deficiencies of conventional photocurable silicone systems, these systems when fully cured are characterized by good toughness and hardness characteristics which in many applications are a decided advantage; however, in a number of sealant, potting, and conformal coating applications, it is more desirable to utilize a soft, flexible, pliable and resilient cured material. The latter characteristics may be desired, for example, in applications involving substantial differential thermal expansion characteristics, such as where the silicone material is employed as a sealant between structural elements possessing substantially different thermal conductivity and heat capacity characteristics, in end use environments of rapidly changing temperature. Another end use application where such soft, flexible, pliable, and resilient character is desired, is the use of coatings on substrates or in elements which are expandable or otherwise must accommodate deformational stresses or pressures (e.g., gasket and bushing materials in high pressure hydraulic systems). In such applications, fully capped photocurable silicone compositions are excessively hard and inelastic, and their use entails the risks or occurrence of failure of the silicone materials, with consequent adverse effect on the efficiency or utility of the structure in which such materials are employed. In such applications, a silicone possessing soft, gel-like texture and accompanying flexibility would better serve the functional performance and physical property requirements for usage of silicone materials.

Accordingly, it would be a significant advance in the art to provide a photocurable silicone composition which can be made without highly toxic reagents in a relatively simple and economic manner, does not require filtering of a viscous polymer product, and comprises a silicone polymer which is capped with an acrylic-functional capper having no $\beta$-oxygenated silicon linkages in its structure.

With respect to the photocurable silicone composition and process of making same which constitutes aspects of the present invention and are more fully described hereinafter, related art to the present invention is discussed below.

"Synthesis of Organosilicon Esters of Hydrozinc Carboxylic Acids", G. S. Gol'din, et al *Zhurnal Obshchei Khimii*, Vol. 43, No. 4, April, 1973, pp. 781–784, discloses the synthesis of 1,3-bis[(acryloxy)methyl]- and 1,3-bis[(methylacryloxy)-methyl]- 1,1,3,3-tetramethyl-disiloxanes by heating mixtures of chloro(chloromethyl)dimethylsilane with acrylic and methacrylic acids in the presence of triethylamine as hydrogen chloride acceptor, with subsequent hydrolysis of the silyl ester:

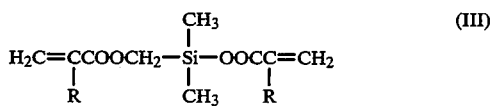

(III)

wherein R=H or CH₃.

U.S. Pat. No. 4,845,259 to M. Arai, et al, assigned to Shin-Etsu Chemical Company, Ltd., and Shin-Etsu's Japanese Kokai Tokkyo Koho JP 01 14226, JP 63 179881, JP 63 185989, and European Patent Application EP 276986, describe the synthesis of a silyl acrylic acid diester of formula (III) above, by reaction of potassium or sodium salts of acrylic acid with chloromethyldimethylchlorosilane. Such synthesis, however, has the disadvantage that the acrylic acid salts employed therein are relatively expensive. In accordance with the teachings of these patents, the silyl diacrylate compound (III) is hydrolyzed to form a silanol capper of the formula:

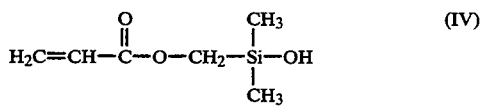

(IV)

Contemporaneously, dimethylchlorosilane is reacted, in the presence of a platinum hydrosilation catalyst, with a vinyl-terminated dimethylsiloxane polymer to yield a product silicone polymer with chloro terminal groups. The silicone polymer is reacted with the silanol capper in the presence of amine to yield an acryloxy methyl-terminated polymer of the formula:

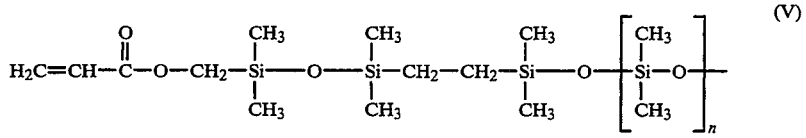

(V)

and thereafter the product is filtered to remove the concurrently formed amine hydrochloride complex therefrom.

U.S. Pat. No. 4,563,539 to G. A. Gornwich, et al, describes UV-curable acrylofunctional silicones which are formed by reaction of aminoalkyl or diaminoalkyl silicones with isocyanato acrylates.

Other relevant acrylic functional silicone references include: U.S. Pat. No. 4,503,208 (preparation of acrylate and 2-alkyl acrylate silicones which are curable by UV exposure, heat, or anaerobic conditions, by hydrosilation of an acrylate or 2-alkyl acrylate ester of an acetylene alcohol with silicon hydride functional silicones); U.S. Pat. No. 4,575,546 (radiation-curable silicone polymers with a plurality of acrylic groups clustered at or near the chain ends thereof); U.S. Pat. No. 4,575,545 (same); U.S. Pat. No. 4,675,346 (silicone resin with terminal acrylic groups and intermediate region free of acrylic groups, formulated with fumed silica filler and photoinitiator, and curable by UV radiation); U.S. Pat. No. 4,504,529 (graff polymers having α-alkyl acrylate functionality, formed as a reaction product of a silicon hydride grafting agent with at least one ec-aikyl acrylate group, and an aliphatically unsaturated polymer, e.g., a polyorganosiloxane); and U.S. Pat. No. 4,655,147 (methacrylated siloxanes prepared by hydrosilation of beta(allyloxy)ethylmethacrylate using a silicon hydride functional siloxane).

Photocurable siloxane rubber compositions are described in Japanese Kokai Tokkyo Koho JP 01 301708, and European Patent Application 0 240 162 A2 describes liquid polyorganosiloxane compositions that cure by a hydrosilation reaction to yield optically transparent elastomers.

Accordingly, it is an object of the present invention to provide a photocurable silicone composition which may be synthesized using relatively low cost, relatively available materials, which is relatively simple in synthesis procedure, and which avoids the necessity of filtering a highly viscous silicone polymer product to remove by-products therefrom.

It is another object of the invention to provide a photocurable silicone composition in which the silicone polymer is free of $\beta$-oxygenated silicon linkages, and whose synthesis can be carried out without highly toxic reactant materials.

Other objects and advantages will be more fully apparent from the ensuing disclosure and appended claims.

SUMMARY OF THE INVENTION

In one aspect, the present invention relates to an acryloxy-functional capped silicone formed as a reaction product of:

(i) a silyl diacrylate compound of the formula:

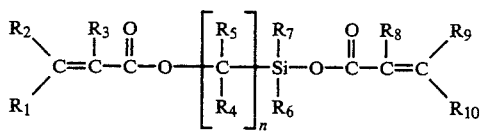

(VI)

wherein: $R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; and (ii) a silicone having at least one functionality which is reactive with an acryloxy functionality of said silyl diacrylate compound to yield said acryloxy-functional capped silicone.

In another aspect, the invention relates to a photocurable silicone composition comprising the above-described acryloxy-functional capped silicone and an effective amount of a photoinitiator for curing of the acryloxy-functional capped silicone under photoinitiating curing conditions.

The silicone functionality which is reactive with the acryloxy functionality of the silyl diacrylate compound may be located on any suitable portion of the silicone molecule. For example, the acryloxy-reactive functionality of the silicone molecule may be bonded to a silicon atom of the silicone, or such reactive functionality may be bonded to another group in the silicone molecule or other constituent atom or group in the molecule. Preferably, the acryloxy-reactive silicone functionality comprises a silicon-bonded functional group including a lablie hydrogen constituent, with the proviso that such functional group is not hydrogen per se.

In another aspect, the present invention relates to a silicone composition, comprising:

(i) a first silane of the formula:

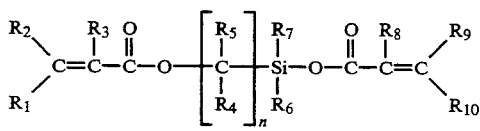

(VI)

wherein: $R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4;

(ii) a second silane of the formula:

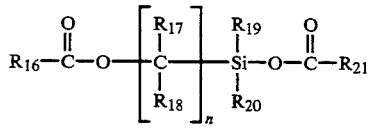

(X)

wherein:

$R_{16}$ and $R_{21}$ are non-polymerizable groups and are independently selected from halo and organo radicals;

$R_{17}$, $R_{18}$, $R_{19}$, and $R_{20}$ are independently selected from hydrogen, halo and organo radicals; and (iii) a polysiloxane having at least two functional groups per molecule with which said first and second silanes are cappingly reactive;

wherein:

(a) the first and second silanes together are provided in sufficient quantity relative to the polysiloxane to react with substantially all (i.e., 90%+) of the cappingly reactive functional groups of the polysiloxane, and (b) the first silane constitutes from about 50% to about 98% of the total weight of the first and second silanes.

Preferably, the first and second silanes together are provided in sufficient quantity relative to the polysiloxane to react essentially completely therewith, i.e., with at least 98% of the cappingly reactive functional groups of the polysiloxane, and the first silane constitutes from about 70% to about 90% by weight of the total weight of the first and second silanes.

In a third aspect the present invention relates to a silicone (i) capped with acryloxy functional moieties derived from a silyl diacrylate capper of the formula:

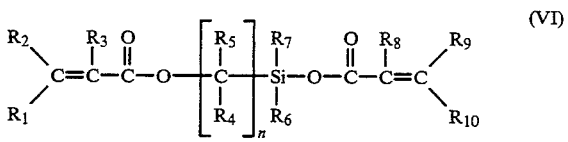

(VI)

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; whereby said resin is partially curable under radiation exposure conditions curingly effective therefor and optionally including the presence therewith of a photoinitiator, and (iii) having additional functionality imparting to the silicone at least one, e.g., a second, partial curing modality different from the partially curingly effective radiation exposure conditions constituting a first partial curing modality therefor.

The preferred silicones are those which are linear, and have terminal and/or pendant (1) acryloxy functionality and/or (2) additional functionality. They are generally represented by the following formula:

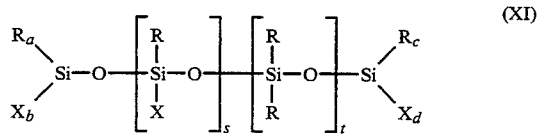

(XI)

wherein:
each R is independently a radical or moiety which is non-reactive in the end-use composition in which the silicone is to be employed, i.e., not reactive with the cure mechanisms to be employed in the end use of the silicone, e.g., each R may be hydrogen, halo, or organo, and preferably is organo selected from $C_1$-$C_8$ aikyl and phenyl, most preferably methyl;

each X independently is (i) an acryloxy functionality derived from the silyl diacrylate capper, or (ii) an additional functionality which is dependent upon a desired further cure modality;

each of a, b, c and d is independently 0, 1,2 or 3;

s is 0 or a positive integer, preferably less than 20, more preferably less than 8; and t is a positive integer;

provided that:

(a+b)=(c+d)=3;

(b+d+s) is greater than or equal to 2; and the equivalents ratio of acryloxysilyl functionality (i) to additional functionality (ii) is from 0.1:0.9 to 0.8:0.2, except where the silicone in its end use is employed in combination with a second constituent which cures by another curing modality, in which case the ratio may be up to 1.0:0.0.

It is understood that in any given silicone polymer chain in the above general formula, all X's may be (i) acryloxy functionality, (ii) additional functionality, or a mixture of (i) acryloxy functionality and (ii) additional functionality.

In another aspect, the present invention relates to a silicone composition, formed as a reaction product of:

(i) a first silane of the formula:

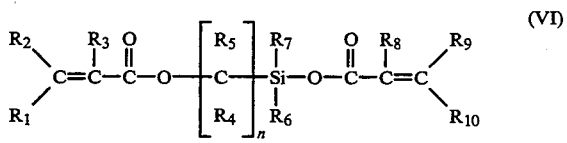

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; and (ii) a silicone having (A) functionality which is reactive with an acryloxy functionality of said silyl diacrylate compound to yield an acryloxy-functional capped silicone which is partially curable under first curing conditions comprising curingly effective radiation exposure conditions optionally including the presence of a photoinitiator, and (B) additional functionality which renders the acryloxy-functional capped silicone partially curable by further curing conditions different from the curingly effective radiation exposure conditions constituting the first curing conditions.

By way of illustration, the silicone functionality which is reactive with the acryloxy functionality of the silyl diacrylate compound(s), may comprise a functionality, e.g., silicon-bonded functionality, selected from the group consisting of:

—OH;

—N(R')$_2$, wherein each of the R' substituents is independently selected from hydrogen and organo groups, with the proviso that at least one R' substituent is hydrogen;

—SH;

SO$_3$H; and where residual acrylic acid groups are present,

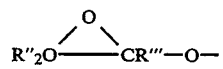

wherein each of the R'' and R''' substituents is independently selected from hydrogen and organo groups.

In a particularly preferred aspect, the aforementioned silyl diacrylate has the formula:

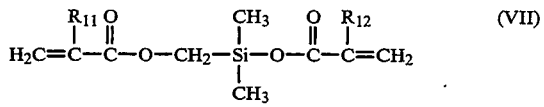

wherein $R_{11}$ and $R_{12}$ are independently selected from H and methyl; and the silicone comprises a linear polydimethylsiloxane with terminal —OH groups.

Another aspect of the present invention relates to a photocured silicone material produced by photocuring a silicone composition comprising the above-described acryloxy-functional capped silicone, under conditions photocuringly effective therefor.

Still another aspect of the invention relates to a method of capping (i) a silicone having an active hydrogen-containing functionality, with (ii) acrylic functionality, to render the silicone photocurable under curing conditions optionally including the presence of a suitable photoinitiator therefor, comprising reacting such silicone with a silyl diacrylate compound of the formula:

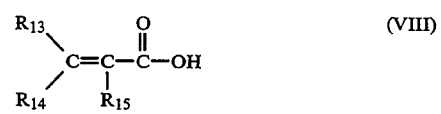

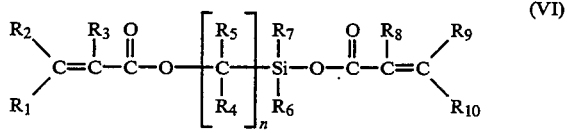

wherein:

$R_1$, $R_2$, $R_3$, $R_4$, $R_5$, $R_6$, $R_7$, $R_8$, $R_9$, and R10 are independently selected from hydrogen, halo, and organo radicals; and n is an integer having a value of from 1 to 4;

A still further aspect of the invention relates to a method of making a silicone composition which is photocurable under photocuring conditions optionally including the presence of a suitable photoinitiator therefor, comprising:

(a) reacting (i) an acrylic acid compound of the formula:

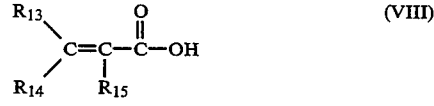

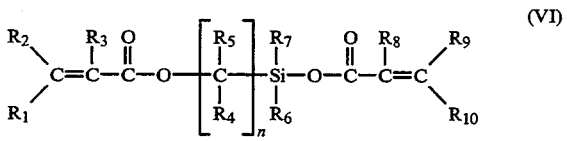

wherein: $R_{13}$, $R_{14}$, $R_{15}$ are independently selected from hydrogen, halo, and organo radicals, and (ii) a chlorosilane compound of the formula:

$$\begin{array}{c} R_2 \\ \diagdown \\ R_1 \end{array} C=C-\overset{R_3}{\underset{}{C}}-\overset{O}{\underset{}{C}}-O {\left[\begin{array}{c} R_5 \\ | \\ C \\ | \\ R_4 \end{array}\right]}_n \begin{array}{c} R_7 \\ | \\ Si-O- \\ | \\ R_6 \end{array} \overset{O}{\underset{}{C}}-\overset{R_8}{\underset{}{C}}=C \diagup_{R_9}^{R_{10}} \qquad (VI)$$

wherein
R$_4$, R$_5$, R$_6$, R$_7$ are independently selected from hydrogen, halo, and organo radicals, and
n is an integer of from 1 to 4;
in the presence of
(iii) a basic hydrogen chloride acceptor, to yield a silyl diacrylate compound of the formula:

$$\begin{array}{c} R_2 \\ \diagdown \\ R_1 \end{array} C=C-\overset{R_3}{\underset{}{C}}-\overset{O}{\underset{}{C}}-O {\left[\begin{array}{c} R_5 \\ | \\ C \\ | \\ R_4 \end{array}\right]}_n \begin{array}{c} R_7 \\ | \\ Si-O- \\ | \\ R_6 \end{array} \overset{O}{\underset{}{C}}-\overset{R_8}{\underset{}{C}}=C \diagup_{R_9}^{R_{10}} \qquad (VI)$$

wherein: R$_1$, R$_2$, R$_3$, R$_4$, R$_5$, R$_6$, R$_7$, R$_8$, R$_9$, and R$_{10}$ are independently selected from hydrogen, halo, and organo radicals; and n is an integer having a value of from 1 to 4; and (b) reacting the silyl diacrylate compound with a silicone having at least one functionality which is reactive with an acryioxy functionality of the silyl diacrylate compound, to yield an acryloxy-functional capped silicone as the silicone composition.

In another aspect, the present invention relates to a method of capping a silicone having a cappable moiety in its structure, comprising:

(a) reacting a carboxyl functional capper precursor with a chlorosilane compound to yield as a reaction product silyl capper compound which is cappingly reactive with the cappable moiety of the silicone; and (b) reacting the silyl capper compound with the cappable moiety of the silicone to yield a capped silicone product.

A further aspect of the present invention relates to a photocurable silicone gel composition formed by reacting the silicone composition broadly described above, viz., the first and second silanes (a) and (b), respectively, with the polysiloxane (c). Such reaction may for example be carried out at a reaction temperature of from about 0° C. to about 100° C., and preferably the reaction is conducted at ambient temperature, e.g., room temperature.

The reaction may be carried out for a selected time period to suitably cap the silanes. This time period will depend on the temperature of the reaction mixture, but generally it is in the range of 0.3 to 4 hours. The reaction may be carried out in any suitable diluent or reaction medium such as a hydrocarbon or halohydrocarbon, e.g., heptane. The resulting photocurable silicone gel composition by exposure to curingly effective radiation is cured to produce a soft silicone gel. For the purpose of effecting such cure, the photocurable silicone gel composition may be formulated with a suitable photoinitiator as appropriate to the specific curingly effective radiation (e.g., ultraviolet (UV) radiation) which is employed.

Yet another aspect of the present invention relates to a cured silicone gel material produced by photocuring the above-described photocurable silicone gel composition, under conditions photocuringly effective therefor.

In another, more general aspect, the present invention relates to a silicone composition, comprising:

(a) a silane of the formula:

$$\begin{array}{c} R_2 \\ \diagdown \\ R_1 \end{array} C=C-\overset{R_3}{\underset{}{C}}-\overset{O}{\underset{}{C}}-O {\left[\begin{array}{c} R_5 \\ | \\ C \\ | \\ R_4 \end{array}\right]}_n \begin{array}{c} R_7 \\ | \\ Si-O- \\ | \\ R_6 \end{array} \overset{O}{\underset{}{C}}-\overset{R_8}{\underset{}{C}}=C \diagup_{R_9}^{R_{10}} \qquad (VI)$$

wherein: R$_1$, R$_2$, R$_3$, R$_4$, R$_5$, R$_6$, R$_7$, R$_8$, R$_9$, and R$_{10}$ are independently selected from hydrogen, halo, and organo radicals; and n is an integer having a value of from 1 to 4; and (b) a non-acrylic capper; and (c) a polysiloxane having functionality which is reactive with the silane (a) and the non-acrylic second capper (b);

whereby the reactive functionality of the polysiloxane is partially cappable by said silane, and partially cappable by said second capper.

These components (a), (b) and (c) may be reacted to yield a photocurable silicone gel composition, which is curable by curingly effective radiation, optionally in the presence of a suitable photoinitiator, to form a product silicone gel.

Still another aspect of the invention relates to a method of making a photocurable silicone gel composition, comprising reacting:

(a) a first silane of the formula:

$$\begin{array}{c} R_2 \\ \diagdown \\ R_1 \end{array} C=C-\overset{R_3}{\underset{}{C}}-\overset{O}{\underset{}{C}}-O {\left[\begin{array}{c} R_5 \\ | \\ C \\ | \\ R_4 \end{array}\right]}_n \begin{array}{c} R_7 \\ | \\ Si-O- \\ | \\ R_6 \end{array} \overset{O}{\underset{}{C}}-\overset{R_8}{\underset{}{C}}=C \diagup_{R_9}^{R_{10}} \qquad (VI)$$

wherein: R$_1$, R$_2$, R$_3$, R$_4$, R$_5$, R$_6$, R$_7$, R$_8$, R$_9$, and R$_{10}$ are independently selected from hydrogen, halo, and organo radicals; and n is an integer having a value of from 1 to 4; and (b) a second silane of the formula:

$$R_{16}-\overset{O}{\underset{}{C}}-O {\left[\begin{array}{c} R_{17} \\ | \\ C \\ | \\ R_{18} \end{array}\right]}_n \begin{array}{c} R_{19} \\ | \\ Si-O- \\ | \\ R_{20} \end{array} \overset{O}{\underset{}{C}}-R_{21} \qquad (X)$$

wherein:
R$_{16}$ and R$_{21}$ are non-polymerizable groups and are independently selected from halo and organo radicals;
R$_{17}$, R$_{18}$, R$_{19}$, and R$_{20}$ are independently selected from hydrogen, halo and organo radicals; and (c) a polysiloxane having at least two functional groups per molecule with which said first and second silanes are cappingly reactive; wherein:

(i) the first and second silanes together are provided in sufficient quantity relative to the polysiloxane to react with substantially all of the cappingly reactive functional groups of the polysiloxane, and with the first silane constituting from about 50% to about 98% by weight of the total weight of the first and second silanes.

A further aspect of the invention relates to a method of forming a cured silicone gel, comprising subjecting the above-described silicone gel composition to curingly effective radiation for sufficient time to form a cured silicone material.

Another aspect of the present invention relates to a cured silicone material produced by partially photocuring a silicone composition comprising the above-described acryloxy-functional capped silicone, under conditions photocuringly effective therefor, and then further curing the silicone composition under conditions which are curingly effective for the additional functionality of the silicone. For example, the further curing may involve moisture cure when the additional silicone functionality comprises hydrolyzable functionality such as alkoxy, oxime, or acetoxy groups. Alternatively, such additional functionality may impart further curability to the silicone by any suitable curing modalities, such as (a) ambient temperature curing, (b) elevated temperature curing, (c) reaction with curative species, (d) radiation exposure differing from the radiation exposure which is curingly effective for the acryloxy functionality of the capped silicone.

Still another aspect of the invention relates to a method of capping:
(i) a silicone having (A) an active hydrogen-containing functionality and (B) additional functionality which renders the capped silicone partially curable by curing conditions other than radiation exposure, with
(ii) acrylic functionality, to render the silicone photocurable under radiation exposure optionally including the presence of a suitable photoinitiator therefor
comprising reacting the active hydrogen-containing functionality (A) of such silicone with a silyl diacrylate compound of the formula:

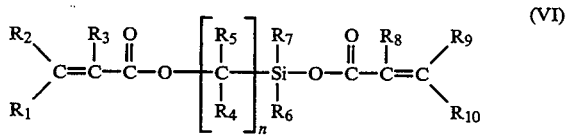

wherein: $R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4.

In general, the above-described additional functionality of the silicone (sometimes hereinafter referred to as the "additional functionality"), i.e., functionality other than the acryloxy functionality of the silicone, may be any suitable functionality imparting the requisite further curing capability to the acrylic-capped silicone. A preferred further curing modality comprises moisture curing, and in such instance, the additional functionality imparting such moisture cure characteristics to the silicone may, by way of example, be selected from the group consisting of:
aryloxy;
oxime;
—OOCR$_{33}$
N,N-dialkylamino;
N,N-dialkylaminoxy;
N-alkylamido;
—O—NH—C(O)—R$_{33}$;

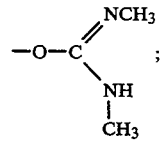

—O—C(CH$_3$)=CH$_2$; and
—S—C$_3$H$_6$Si(OCH$_3$)$_3$;
wherein R$_{33}$ is H or hydrocarbyl.

It is within the broad purview of the present invention:

(1) to utilize an acrylic capping compound (i.e., the silyl diacrylate compound) to functionalize and render partially photocurable a silicone which also contains additional functionality imparting a second curing modality to the acrylic capped silicone, as well as, (2) to utilize additional reactant(s), e.g., additional cappers, with the acrylic capping compound reacted with the silicone, in order to impart functionality to the silicone by which the further curing thereof may be effected.

In other words, (i) the silicone prior to capping thereof with the acrylic capping compound may already have additional functionality permitting the subsequently capped reaction product (silicone) to be further cured by a particular additional curing modality, and/or (ii) the reaction of the acrylic capper and the silicone may be conducted with an additional co-reactant species which reacts with the silicone to yield additional functionality imparting a further cure modality to the silicone.

Other aspects and features of the present invention will be more fully apparent from the ensuing disclosure and appended claims.

DETAILED DESCRIPTION OF THE INVENTION AND PREFERRED EMBODIMENTS THEREOF

The photocurable composition of the present invention is based on the surprising and unexpected discovery that acrylic-functional capper compounds of the formula:

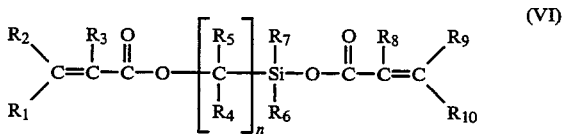

wherein: $R_1$, $R_2$, $R_3$, $R_4$, $R_5$, $R_6$, $R_7$, $R_8$, $R_9$, and $r_{10}$ are independently selected from hydrogen, halo, and organo radicals; and n is an integer having a value of from 1 to 4, may be used to cap silanol-terminated silicone polymers by simply mixing the capper with the silicone polymer for a short period of time at ambient or relatively low elevated temperature, e.g., 100° C., preferably at ambient or room temperature.

For ease of reference in the ensuing discussion, the acrylic functional capper of formula (VI) above will sometimes hereinafter be denoted as the "silyl diacrylate compound", the "silyl diacrylate capper", or more simple the "capper".

The highly efficient reaction of the silyl diacrylate capper with a silanol-ended silicone polymer was very surprising. It is generally perceived that monoacetoxysilanes at best will react with silanols only very sluggishly. It therefore is particularly unexpected that end-capping with the silyl diacrylate capper can take place at room temperature. Indeed, in the patent references hereinabove in the "Background of the Invention" section hereof, it is not even contemplated that such a facile reaction could take place. Instead, these references teach to hydrolyze the capper to prepare a silanol compound, contemporaneously with hydrosilylating a vinyl silicone polymer with a chloromethylsilane compound to yield a chloro-terminated silicone polymer. This extensive and circuitous synthetic route to achievement of an acrylic-functional terminated silicone polymer is based on the aforementioned general perception that monoacetoxysilanes will at best react with silanols only very sluggishly, and points up the substantial and unobvious character of the simple, economic methodology used for making the photocurable silicone product in the broad practice of the present invention.

The capper after it is formed by the reaction of a chlorosilane compound and acrylic acid, may subsequently be employed to form a photocurable silicone composition by reacting the capper with a silicone having at least one functionality which is reactive with an acryloxy functionality of the capper, to yield an acryloxy-functional capped silicone.

This acryloxy-functional capped silicone then may be suitably combined with an effective amount of a photoinitiator for curing of the acryloxy-functional capped silicone under photoinitiating curing conditions, to yield a photocurable silicone composition.

In embodiments of the present invention where two different cappers are employed, the silyl diacrylate capper may suitably be formed by the reaction of a chlorosilane compound and acrylic acid, and may subsequently be employed to form a photocurable silicone composition by reacting (1) the silyl diacrylate capper and (2) a second, non-acrylic capper, preferably another silane capper which is non-acrylic in character (sometimes hereinafter referred to as "the second silane"), with (3) a silicone having functionality which is reactive therewith, to yield an acryloxy-functional capped silicone, which then is curable by curing conditions comprising radiation exposure, in the presence of a photoinitiator if required.

Among capper compounds of the general formula (VI) set out broadly hereinabove, a particularly preferred class of such compounds includes those in which $R_1$, $R_2$, $R_3$, $R_4$, $R_5$, $R_8$, $R_9$, and $R_{10}$ are independently selected from hydrogen, halo, and $C_1$-$C_8$ alkyl radicals, and $R_6$ and $R_7$ are independently selected from hydrogen, halo, $C_1$-$C_8$ alkyl, and phenyl. In this preferred class of compounds, n may have a value of 1 to 2, and most preferably is 1. When n is 2, the silyl diacrylate capper is a β-oxygenated silicon compound. As mentioned hereinabove, β-oxygenated silicon compounds have a susceptibility to undergoing β-elimination reaction, but despite this potential occurrence, B-oxygenated silyl diacrylate cappers of the present invention nonetheless are markedly superior to prior art β-oxygenated silicon capper compounds (e.g., the prior art capper compound of formula (I) described in the "Background of the Invention" section hereof), with respect to their ease of synthesis, and the economic advantages and time savings associated therewith. In any event, to minimize stability problems, n in the sily diacrylate compounds of the present invention may suitably have a value of 1, 3, or 4.

A more specific class of preferred compounds of formula (VI) above includes compounds in which $R_1$, $R_2$, $R_9$ and $R_{10}$ are hydrogen; $R_3$, $R_4$, $R_5$ and $R_8$ are independently selected from hydrogen and $C_1$-$C_8$ alkyl; $R_6$ and $R_7$ are independently selected from $C_1$-$C_8$ alkyl, and phenyl; and n is 1.

A highly preferred silyl diacrylate capper in the practice of the present invention is the silyl diacrylate compound of the formula:

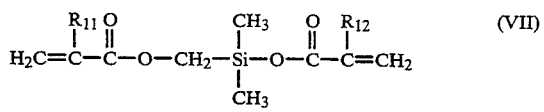

wherein $R_{11}$ and $R_{12}$ are independently selected from H and methyl.

The silicone which is reactive with the capper to form the acryloxy-functional capped silicone of the invention, may suitably have a silicone functionality reactive with the acryloxy functionality of the capper, which comprises a so-called "active hydrogen" constituent, e.g., a silicon-bonded functional group including a lablie hydrogen constituent.

In general, the reactive functionality of the silicone which is reactive with the acryloxy functionality of the capper, may be located in any suitable part of the silicone molecule, as a terminal group of a silicone backbone, or as an end group of a side chain on the silicone, or otherwise as may be advantageous. Preferably, the silicone reactive functionality is bonded to a silicon atom in the silicon molecule, but such positioning is not required, and the silicone reactive functionality may be joined to any other atoms or groups in the silicone molecule, such as to a hydrocarbon bridging group, or other moiety of the silicone molecule.

Another highly preferred silyl diacrylate capper in the practice of the present invention is the silyl diacrylate of the formula:

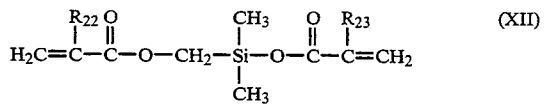

wherein $R_{22}$ and $R_{23}$ are independently selected from H and methyl.

The so-called second silane referred to above may have the formula:

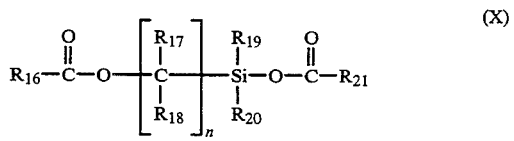

wherein:

R$_{16}$ and R$_{21}$ are non-polymerizable groups and are independently selected from halo and organo radicals;

R$_{17}$, R$_{18}$, R$_{19}$, and R$_{20}$ are independently selected from hydrogen, halo and organo radicals; and n is an integer having a value of from 1 to 4.

In the second silane of the above general formula, R$_{16}$ and R$_{21}$ more preferably are independently selected from hydrocarbyl, fluorocarbyl and fluorohydrocarbyl. By way of example, R$_{16}$ and R$_{21}$ may suitably be organo radicals containing from 1 to 8 carbon atoms, and most preferably are independently selected from C$_1$–C$_8$ alkyl radicals. Preferably, R$_{17}$, R$_{18}$, R$_{19}$ and R$_{20}$ are independently selected from hydrogen, lower (C$_1$–C$_8$) alkyl, and phenyl, and most preferably R$_{17}$ and R$_{18}$ are hydrogen, and R$_{19}$ and R$_{20}$ are methyl.

A highly preferred second silane capper has the formula:

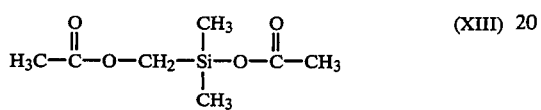

(XIII)

Although the second silane described above is a preferred additional capper employed in combination with the silyl diacrylate capper, to cap the functional sites on the silicone which are reactive therewith, it will be appreciated that the invention may broadly be practiced utilizing second capper species other than the second silane capper illustratively discussed hereinabove.

The purpose of the second capper is to cap a portion of the cappable reactive sites on the silicone, so that only part of the cappable sites are capped with the silyl diacrylate capper. In other words, a portion of the cappable sites on the silicone is capped with the silyl diacrylate capper, and a portion is capped with the second capper. By this less-than-complete capping with the silyl diacrylate capper, the resulting silicone when photocured will exhibit an increased softness and gelatinous character, relative to a corresponding silicone which is fully capped with the silyl diacrylate capper.

It may also be feasible in some instances to cap the silicone with only a silyl diacrylate capper of the type described above, but to carry out the capping with an equivalents ratio of the capping acryloxysilyl functionality (i..e., capping moleties derived from the silyl diacrylate capper) to the acryloxy-reactive functionality of the silicone, of less than 1.0, so that some of the acryloxy-reactive functionality on the silicone remains uncapped.

In general, however, when a softened photocured composition is desired, it is preferred to cap all of the acryloxy-reactive functionality of the silicone, in part with the silyl diacrylate capper, and in part with a second capper, rather than providing only the silyl diacrylate capper (acryloxysilyl functionality) in a less than 1.0 equivalents ratio relative to the reactive functionality of the silicone. The reason for this preference is that if reactive, uncapped functionality remains on the silicone, it may undesirably give rise to a second curing modality, e.g., moisture cure, which may yield physical properties approaching those of the corresponding fully acrylic-capped silicone, when a softer (lower durometer hardness) material is desired as the final cured product.

Thus, the second capper may comprise various organocarboxy capper species of formula (X) above, as well as any other suitable capper compounds which are reactive with the functionality of the polysiloxane which also is reactive with the silyl diacrylate capper.

In the broad practice of this embodiment of the present invention, the silyl diacrylate, or first silane capper, may suitably comprise a mixture of various compounds within the general formula of (VI) above, and the second capper may likewise comprise a mixture of silane compounds of the general formula (X) above.

Concerning the functional groups of the polysiloxane which are cappingly reactive with the first and second silane cappers, such functional groups may include any suitable functionality which is reactive with the first and second silanes to provide a resulting photocurable silicone gel composition. The silicone functionality which is reactive with the acryloxy functionality of the silyl diacrylate compound may be located in any appropriate part of the silicone molecule, e.g., as a terminal functionality on a linear silicone backbone, as an end group on a siloxy side-chain, or otherwise within the structure of the silicone. Correspondingly, the silicone functionality which is reactive with the acryloxy functionality of the silyl diacrylate compound, may be bonded to any suitable atom or moiety in the silicone molecule, e.g., to a silicon atom, or to another atom or group in the molecule, e.g., a hydrocarbon bridging group which in turn is joined to a silicon atom. In a preferred aspect, the silicone functionality which is reactive with the acryloxy functionality of the silyl diacrylate compound, comprises a silicon-bonded functional group including a lablie hydrogen constituent, with the proviso that such functional group is not hydrogen per se.

By way of example, the silicone functionality which is reactive with the acryloxy functionality of the capper, may comprise an active hydrogen-containing functionality, such as a silicon-bonded functionality of such type, selected from the group consisting of:

—OH;

—N(R')$_2$, wherein each of the R' substituents is independently selected from hydrogen and organo groups, with the proviso that at least one R' substituent is hydrogen;

—SH; and

—SO$_3$.

In instances where the capper component reacted with the cappable silicone contains residual acrylic acid groups deriving from the synthesis of the capper, the silicone functionality which is reactive with the capper may be constituted by a functionality, e.g., a silicon-bonded functionality, of the formula

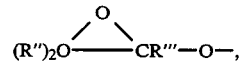

wherein each of the R" and R"' substituents is independently selected from hydrogen and organo groups.

Preferably the active hydrogen-containing functionality is hydroxyl, and such functionality is silicon-bonded.

It will be recognized that the foregoing species of functionality for the polysiloxane are illustrative only and that any other functional groups which are reactive with the capper species employed, which are compatible with the constituents of the formulation in which the capped polysiloxane ultimately is used, and which do not preclude the utility of the resulting photocurable silicone compositions for their intended purpose, may advantageously be employed.

The silicone which is co-reacted with the capper may suitably comprise a linear polydiorganosiloxane, or other linear silicone, having a weight average molecular weight which may for example range from about 700 to about 300,000, preferably from about 10,000 to about 80,000, and most preferably from about 10,000 to about 50,000.

Although the silicone reacted with the capper to form the acryloxy-functional capped silicone of the invention is preferably linear in conformation, other, non-linear silicones, e.g., branched, cyclic, or macromerle, may potentially usefully be employed in the broad practice of the present invention. Preferably, the silicone (polysiloxane) is predominantly linear in character. The acryloxy-reactive functionality may be located in any suitable portion of the polysiloxane molecule, for example as terminal and/or pendant functionality, but preferably is a terminal functional group, and most preferably, the polysiloxane is a linear molecule both of whose terminal functional groups comprise acryloxy-reactive functional groups, e.g., terminal hydroxy groups. Thus, for example, the polysiloxane material may comprise a hydroxy-terminated polydiorganosiloxane, e.g., a hydroxy-terminated polydimethylsiloxane, or a hydroxy-terminated polydiphenylsiloxane. Preferably, the silicone is an organo polysiloxane whose organo substituents are predominantly methyl. A particularly preferred polysiloxane material which has been usefully employed in the practice of the present invention is a hydroxy-terminated polydimethylsiloxane of linear configuration, having a weight average molecular weight on the order of 28,000.

As mentioned, the silicone comprising the acryloxy-reactive functionality may be macromeric in character, including polysiloxane resins comprising M, D, T, and Q siloxy units, with at least one acryloxy-reactive functionality, and preferably more than one acryloxy-reactive functionality, per molecule.

As used in the preceding paragraph, the terms M, D, T, and Q units refer to monofunctional, difunctional, trifunctional and tetrafunctional siloxy units, respectively, as defined in U.S. Pat. No. 4,568,566, to L. A. Tolentino, at column 5, lines 51–55 thereof.

Although the capper and the silicone comprising acryloxy-reactive functionality may be utilized in any suitable proportions relative to one another, consistent with the number of acryloxy-reactive functional groups on the silicone molecule, it generally is preferred to utilize relative amounts of the capper and the acryloxy-reactive silicone providing up to about 1.5 or more equivalents of acryloxysilyl functionality for reaction with the acryloxy-reactive functionality of the silicone, and preferably the equivalents ratio of acryloxysilyl functionality to acryloxy-reactive functionality is from about 1.0 to about 1.2.

If the equivalents ratio of the acryloxysilyl functionality of the capper to the acryloxy-reactive functionality of the silicone is less than 1.0, so that the acryloxy-reactive functionality of the silicone is not fully capped with acryloxysilyl functionality, then photocuring of the resultant partially capped silicone will produce a photocured silicone of a softer (lower durometer) character than the corresponding photocured silicone which is fully capped with acryloxysilyl functionality. Thus, the softness of the photocured product increases with decreasing extent of acryloxysilyl capping. In this manner, it is possible to formulate partially-capped silicones having a soft, gelatinous consistency which may be usefully employed in applications such as sealants, conformal coatings, and potting materials, as more fully described hereinbelow.

It may also be desirable in some applications to utilize a less than stoichiometric amount of the acrylic capper, relative to the acryloxy-reactive functionality present on the silicone, to produce a polymodal-curing silicone, by employing the remaining untapped functionality to provide another cure modality, either by itself, or as further functionalized by reaction with another capper or other co-reactant. Silicone compositions of such type are more fully described hereinbelow.

In the reaction of the polysiloxane with the first and second silanes, the polysiloxane is capped with acryloxy functionality deriving from the first silane while concurrently the polysiloxane is capped by functionality, e.g., acetoxy functionality, deriving from the second silane.

For example, when acryloxymethyldimethylacryloxysilane is employed as the first silane, the capping moiety resulting therefrom is an acryloxymethyldimethylsiloxy functional group, and when acryloxymethyldimethylacetoxysilane is employed as the second silane, the capping moiety resulting therefrom is an acetoxymethyldimethylsiloxy group.

In general, any suitable ratio of the first and second silanes relative to one another may be employed, depending on the ultimate physical properties and end use application desired for the silicone gel produced by photocuring the photocurable composition. The second silane provides a capping moiety on the polysiloxane which does not contribute to the polymerizability of the polysiloxane, in contrast to the first silane, which caps the polysiloxane to provide an acryloxy functionality by means of which the polysiloxane is rendered polymerizable under photocuring conditions. Thus, with respect to the available "cappable" sites on the polysiloxane molecule, an increasing concentration of the second silane relative to the first silane will produce a progressively softer silicone gel when the capped composition is polymerized. In this manner, the second silane serves to functionalize the polysiloxane with "inert" or non-polymerizable capping moieties.

If all of the available capping sites on the polysiloxane are capped with acryloxy functionality deriving from the first silane, the resulting silicone composition when cured produces a very hard, physically tough, polymerized silicone product. Conversely, if all of the capping sites on the polysiloxane are capped by the second silane, then no polymerization of the polysiloxane will be effected under photocuring conditions, and the material will be and remain fluid in character. Intermediate to these two extremes, the polysiloxane will be increasingly softened with respect to its final cured product as the proportion of its capping sites occupied by capping moieties derived from the second silane increases, relative to the number of capping sites on the polysiloxane which are occupied by acryloxy capping functionality deriving from the first silane.

As a further specific illustration of the variation in physical properties of the cured silane associated with changes in the relative proportions of the first and second silanes, using a 28,000 weight average molecular weight silanol-terminated linear polydimethylsiloxane as the resin to be capped, a polysiloxane of such type when fully encapped with acryloxy functionality has a durometer (00) hardness value after the material is photocured which is on the order of 75. By contrast, a polysiloxane starting material of the same type, when approximately half of the cappable sites on the polysiloxane molecule are capped with acryloxymethyldimethylsiloxy functionality, deriving from acryloxymethyldimethylacryloxysilane as the first silane capper, and half with acetoxymethyldimethylsiloxy functionality, deriving from acetoxymethyldimethylsiloxy as the second silane ("inert") capper, yields a capped silicone which is a very soft gel and which probably has a durometer (00) hardness value of 5 or less when photocured. Intermediate these relative capping concentrations, with acryloxy functionality capping levels on the order of 75% of the available capping sites on the polysiloxane molecule, and the remaining 25% of such sites being occupied by capping moieties deriving from the inert capper (second silane), the durometer (00) hardness may be on the order of 15-25.

It will be apparent from the foregoing that the physical properties of the capped silicone when photocured may be varied widely by changing the relative amounts of the first and second silanes which are employed to cap the silicone. Thus, the amount of each capper which is employed in a given application will depend on the specific end use of the photocured material, and the specific chemical compositions of the cappers and the polysiloxane which are employed. The relative amounts of the cappers which are required for any specific application may readily be determined by the skilled artisan without undue experimentation, by simple tests involving variation of the relative amounts of the two cappers and subsequent measurement of the cured properties of the appertaining composition.

In general, the requisite softening of the cured polysiloxane material, in applications such as conformal coatings, sealants, potting applications, and the like, may be achieved with relative amounts of the first silane (acrylic capper) to the second silane (inert capper) of from about 50% to about 90% by weight of the first silane, based on the total weight of the first and second silanes, and with the total amount of first and second silanes being stoichiometrically adequate to effect substantially full capping of the available capping sites on the polysiloxane molecule.

Preferably the (first silane)/(first silane + second silane) weight ratio is from about 0.5 to about 0.98, and preferably form about 0.7 to about 0.9. Correspondingly, in the capped polysiloxane, it is preferred that the equivalents ratio of the capping functionality derived from the first silane to the total capping functionality derived from the first and second silanes with which the polysiloxane is capped is from about 0.50 to about 0.98, and most preferably from about 0.70 to about 0.90.

Preferably, at least a stoichiometric (total) amount of the two cappers (first silane and second silane) is employed with the polysiloxane, and most preferably, a slight stoichiometric excess of the two cappers is employed to ensure full capping of the available sites on the polysiloxane.

In such manner, the first and second silanes together are provided in sufficient quantity relative to the polysiloxane to react with substantially all (i.e., at least 90%) of the cappable reactive functional groups (reactive sites) of the polysiloxane, and most preferably the capping of such functional groups of the polysiloxane is essentially complete, i.e., at least 98% of such sites are capped.

The capping reaction takes place relatively rapidly (e.g., from about 0.1 to about 4 hours) at ambient (room temperature) conditions, and such ambient conditions are preferred to avoid the requirement of heating the reaction mixture (comprising the first and second silanes and the polysiloxane) to yield the photopolymerizable silicone gel composition. Generally, however, the reaction may be usefully conducted at temperatures in the range of from about 0° C. to about 100° C., with higher temperatures within such range being usefully employed to effect removal of any acrylic acid produced in the synthesis.

Further, a silicone gel composition may be advantageously synthesized in some applications by fully capping the silicone with a silyl diacrylate capper, followed by reaction of a portion of the resulting acryloxy capping moieties with a less than stoichiometric amount of a co-reactant, yielding a reaction product capping moiety which is non-polymerizable in character.

As a further alternative, it may be advantageous in some applications to cap a portion of the reactive sites on the silicone with a silyl diacrylate compound, and to cap the remaining reactive sites with more than one "inert", or non-polymerizable, capper species. What is required in each instance, regardless of the synthesis methodology, is the provision of a photocurable silicone having only a portion of its cappable sites capped with polymerizable acrylic functionality.

After being polyfunctionalized by capping with the first and second silanes, the acryloxy-functional capped silicone may be suitably combined with an effective amount of a photoinitiator for curing of the acryloxy-functional capped silicone under photoinitiating curing conditions. The polyfunctionalized silicone and the photoinitiator may also be formulated with any compatible and efficacious curatives, other initiators, accelerators, etc., as appropriate to the character of the desired silicone gel produced by photocuring of the composition.

The photocurable silicone composition of the present invention may suitably comprise a photoinitiator which may include any photoinitiator known in the art which is effective to cause curing of acrylic functionalities. Potentially useful photoinitiators may include, by way of example, benzoin, substituted benzoins such as benzoin ethyl ether, benzophenone, benzophenone derivatives, Michler's ketone, dialkoxyacetophenones such as diethoxyacetophenone, acetophenone, benzil, and other derivatives (substituted forms) and mixtures thereof. A particularly preferred photoinitiator material is diethoxyacetophenone. Although any suitable effective amount of photoinitiator may be employed in the photocurable silicone compositions of the invention, generally the photoinitiator concentration will usefully be in the range of about 0.1% to about 10% by weight, and more specifically and preferably from about 0.2% to about 5% by weight, based on the weight of the capped silicone.

The photoinitiator employed in the photocurable silicone compositions of the present invention may also be polymer bound. Such photoinitiators are described in U.S. Pat. Nos. 4,477,326 and 4,587,276. Other free radical initiators, such as peroxy thermal initiators may be used in some of the lower molecular weight silicone formulations of the invention.

The additional functionality referred to above as imparting additional curing modality or modalities to the silicone molecule may be already present in the molecule at the time that the silicone is reacted with the capper. Alternatively, the silicone may be provided with such additional functionality at the same time as the silicone is reacted with the acrylic capper to form the acryloxy-functional capped silicone, or subsequently thereto. The additional functionality can either directly impart additional curing capability to the silicone, so that such functionality alone permits the silicone to cure by other cure mode(s), or else the additional functionality can indirectly impart additional curing capability to the silicone, as a precursor, intermediate, or co-reactant with another species, resulting in curing or curability of the silicone by other cure mode(s).

In a usefully employed synthesis method, the silicone is suitably polyfunctionalized, by reacting the silicone with the capper at the same time as the silicone is reacted with a co-reactant to provide the additional functionality on the silicone molecule. The additional functionality imparts to the capped silicone the capability of curing under conditions other than the radiation exposure conditions which are curingly effective for the silicone as a result of its capping by the silyl diacrylate compound.

Regardless of the specific synthesis methodology and reaction steps employed to functionalize the silicone for polymodal curing, there is provided a silicone which:

(i) is capped with acryloxy functional moieties derived from a silyl diacrylate capper of the formula:

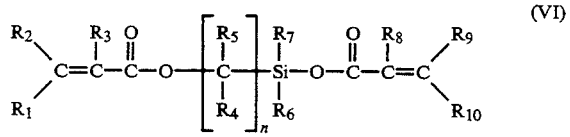

wherein: $R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; whereby the silicone is partially curable under radiation exposure conditions curingly effective therefor, and (ii) has additional functionality imparting to the silicone at least one, e.g., a second, partial curing modality different from the partially curingly effective radiation exposure conditions constituting a first partial curing modality therefor.

In such manner, the resulting capped and polyfunctionalized silicone is able to be partially cured by radiation exposure, which is partially curingly effective for the silicone by virtue of its acryloxy functional moieties (and optionally, and preferably, with a suitable photoinitiator being present), with the silicone also being partially curable by another (or other) curing mode(s), e.g., under curing conditions such as:

(a) ambient temperature exposure;
(b) moisture exposure;
(c) elevated temperature exposure;
(d) reaction with curative species; and
(e) radiation exposure differing from the radiation exposure which is curingly effective for the silicone by virtue of its acryloxy functionalization.

By way of example, the silicone may be additionally functionalized with oxirane functionality, such as cycloaliphatic epoxy groups, epoxidized novolak functionality, or glycidoxy groups. As is well known, a wide variety of curing conditions and curatives may be employed to cure various epoxy materials, as described in "Epoxy Resins, Chemistry and Technology," May and Tanaka, Marcel Dekker, Inc., New York (1973), hereby incorporated by reference. Heat-curing epoxy functionality may be employed with conventional heat-activated epoxy curatives, as for example:

(i) Lewis acid (cationic) catalysts, such as boron trifluoride amine complexes, e.g., boron trifluoride monoethyl amine, as well as the metal halides of tin, aluminum, zinc, boron, silicon, iron, titanium, magnesium, and antimony, and the like;

(ii) acid anhydrides, such as hexahydrophthalic anhydride, tetrahydrophthalic anhydride, nadic methyl anhydride, dodecenyl succinic anhydride, and the like;

(iii) imidazoles, such as derivatives of 2-phenyl imidazole, and derivatives of 1-cyanoethyl-2-phenylimidazole, and the like;

(iv) dicyanodiamide, optionally in combination with accelerators such as phenyl methyl urea or piperidine;

(v) latent amine curatives, such as the modified polyamide disclosed in U.S. Pat. No. 4,459,398, and available from Ciba Geigy as Hardner HT939;

(vi) amines per se, e.g., tertiary amines such as pyridine, 2,4,5-tris(dimethylaminoethyl)phenol, benzyldimethylamine, and triethylamine, and secondary amines such as piperidine, diethanolamine, and the like; and (vii) dissociable amine salts, such as the tri(2-ethylhexanoate) salt of tris(dimethylaminomethyl)phenol, and the like.

Silicones with oxirane functionality may also be cured at ambient temperature conditions using a variety of known and commercially available curatives.

Another class of additional functional groups which may be provided on the capped silicone molecule comprises moisture-curing functionality, e.g., alkoxy, enoloxy, amine, acetoxy, oxime, etc., cured by exposure at ambient conditions, e.g., in the presence of atmospheric moisture.

Another class of functional groups imparting additional partial curability to the capped silicone molecule comprises isocyanate functionality, by which the capped silicone may be cured in the presence of active hydrogen-containing compounds. The active hydrogen compounds may for example be silanols, polyesters prepared from polycarboxylic acids and polyhydric alcohols, polyhydric polyalkylene ethers having at least two hydroxy groups, polythioether glycols, polyester amides, etc.

A further class of additional functionality which may be potentially suitable for imparting partial cure characteristics to the capped silicone molecule comprises vinyl functionality. The vinyl-containing capped silicone resin may be usefully employed with a cross-linking agent such as a hydride-containing resin or a hydrogen-containing polysiloxane, and may be cured at room temperature in the presence of a platinum catalyst.

Still other functional groups which may be usefully employed as the additional functionality of the capped silicone molecule include alkyd and aminoplast moieties.

It will be recognized that the foregoing classes of additional functionality for the capped silicone in the broad practice of the present invention, are illustrative only and that any other effective functionality or functional groups, which are compatible with the capped silicone and other constituents of the formulation in which the capped silicone ultimately is used, and which do not preclude the utility of the silicone, may advantageously be employed.

Furthermore, while this embodiment of the invention has been described hereinabove with particular reference to capping of a cappable polysiloxane (silicone) with (1) a silyl diacrylate capper (first capper) and (2) a second capper, which may for example comprise acetoxymethyldimethylacetoxysilane, or other silyl diester compound, it will be appreciated that such description is illustrative only, and that other capping moieties may be used in the broad practice of the present invention. For example, the capper may comprise a single silane compound having both acryloxy and acetoxy functionality, whereby the silicone is difunctionally capped with acryloxy and acetoxy moieties using a single capper compound.

Moisture-curing, acryloxy-capped silicones are a preferred multifunctionalized silicone species within the broad scope of the present invention. It may be advantageous, depending on the specific identify of the functionality imparting moisture curability to the silicone, to include a moisture curing catalyst, such as an orthotitanate catalyst, in compositions containing the radiation-curable/moisture-curable silicone. Where the moisture cure (hydrolyzable) groups are methoxy or other hydrocarbyloxy groups, such catalysts are generally necessary to achieve cure. On the other hand, where the hydrolyzable groups are amino, such catalysts may not be necessary.

Radiation-curable/moisture-curable capped silicones in the practice of the present invention may for example comprise as the moisture cure-imparting functionality the following functional groups, which preferably are bound to silicon atoms in the silicone:

amino;
vinyl;
hydrogen;
enoloxy;
hydroxy;
alkoxy;
aryloxy;
oxime;
—OOCR$_{33}$
N,N-dialkylamino;
N,N-dialkylaminoxy;
N-alkylamido;
—O—NH—C(O)—R$_{33}$;

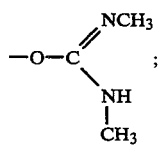

—O—C(CH$_3$)=CH$_2$; and
—S—C$_3$H$_6$Si(OCH$_3$)$_3$;
wherein R$_{33}$ is H or hydrocarbyl.

For example, the silicone being functionalized with a moisture-curing functionality may suitably comprise a silanol-functionalized polydiorganosiloxane, and the co-reactant therewith may be a silane crosslinker of the formula:

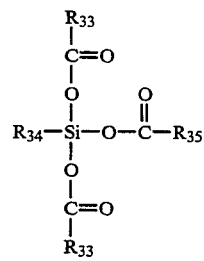

wherein: R$_{34}$ is C$_1$-C$_8$ alkyl, or

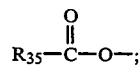

and each R$_{35}$ is independently selected from hydrogen and C$_1$-C$_8$ alkyl.

Another illustrative co-reactant cross-linker which may be usefully employed to impart moisture curability to a silicone containing silanol groups, or other functionality reactive with the cross-linker, comprises vinyl-trimethylethylketoximosilane.

As a further, more specific example, the starting silicone material may comprise a silanol-functionalized polydimethylsiloxane, and the moisture cure-functionalizing coreactant may comprise ethyltriacetoxysilane, as a result of which the silicone reaction product is functionalized with acetoxy functionality.

Other cross-linker co-reactant species potentially useful for moisture-curably functionalizing the silicone in the broad practice of the present invention are well-known in the moisture-curing silicones art and and are readily commercially available.

Although the foregoing discussion of additional cure functionality has been directed to the preferred silicone having further moisture-curing capability in addition to radiation exposure curability, it will be recognized that the silicones of the invention may be otherwise functionalized for further curability, e.g., with members of the classes of functional groups hereinabove described, and that the silicones may be polyfunctionalized for more than two cure modalities. For example, silicones may be multifunctionalized for concurrent or sequential curing, such as by:

(i) radiation curing, (ii) moisture-curing, and (iii) heat curing:
(ii) radiation curing, (ii) anaerobic curing, and (iii) moisture curing; etc.

Depending on the composition, processing, and end use of the composition containing the polymodal-curing silicone of the present invention, any suitable sequence of curing steps can be carried out to effect curing of the silicone composition. Thus, the photocuring effected by radiation exposure of the composition can be carried out initially, prior to other curing step(s), or such radiation curing may take place as the final curing step, or alternatively such radiation curing may be an intermediate step in a series of three or more curing steps which are carried out to fully cure the silicone composition.

In general, however, it is preferred, particularly when the silicone composition is employed in coating, bonding, and potting applications requiring handling, assembly, or packaging immediately after the composition is applied, to initially cure the silicone composition by exposure to radiation and to provide photocurable acrylic functionality in sufficient quantity to immobilize the composition and render it amenable to such further handling, assembly, packaging, or other processing steps, in instances in which the subsequent curing step(s) are desirably or necessarily delayed until the completion of such "downstream" activity.

The compositions of the invention may also include other ingredients to modify the cured or uncured properties of the compositions, as desired for specific end uses.

Fillers or reinforcing materials may usefully be employed in compositions of the present invention to provide enhanced mechanical properties, and in some instances enhanced UV radiation curability of the composition. Among preferred fillers are reinforcing silicas. The reinforcing silicas are fumed silicas which may be untreated (hydrophilic) or treated so as to render them hydrophobic in character.

In general, fillers may be employed at any suitable concentration in the curable silicone composition, but generally are present at concentrations of from about 5% to about 45% by weight, based on the weight of the acryloxy-functional capped silicone. Generally, any other suitable mineralic, carbonaceous, glass, or ceramic fillers may be potentially advantageously employed. Examples include ground quartz, tabular alumina, diatomaceous earth, silica balloons, calcium carbonate, carbon black, titanium oxide, aluminum oxide, aluminum hydroxide, zinc oxide, glass fibers, etc.

In addition, the photocurable silicone composition may also optionally contain an adhesion promoter, to enhance the adhesive character of the composition for a specific substrate (e.g., metal, glass, ceramic, etc.), when the composition is employed for such purpose, depending on the specific substrate elements employed in a given application. For example, the adhesion promoter might be selected to enhance adhesion of the composition on substrates comprising materials such a metals, glasses, plastics, ceramics, and mixtures, blends, composites, and combinations thereof. Various organosilane compounds may be usefully employed for such purpose, and such compounds may also desirably feature oxirane functionality, as well as silicon-bonded alkoxy substituents, to provide broad adhesive bonding utility. In such organosilane compounds, the oxirane functionality may be provided by a glycidoxyalkyl substituent on a silicon atom of the silane compound. A particularly preferred adhesion promoter of such type is glycidoxypropyltrimethoxysilane.

In addition, further additives, such as MQ or MDQ resins, can be incorporated, to vary the properties of the silicone composition as desired.

Besides the constituents identified above as being optionally includable in the silicone compositions of the present invention, further optional constituents include antioxidants, flame retardants, and pigments, etc., as well as filler adjuvants, e.g., filler-treating agents such as hydroxy-terminated vinylmethoxysiloxane, for filler treatment of quartz or similar fillers when used in the composition.

The photocurable silicone compositions of the present invention may be photocured by exposure to any radiation conditions which are curingly effective for the composition. Suitable radiant energy types which may be usefully employed include electron beam radiation, ultraviolet radiation, visible light radiation, gamma radiation, X-rays, β-rays, etc. Preferably, the photocuring radiation is actinic radiation, i.e., electromagnetic radiation having a wavelength of about 700 nm or less which is capable of effecting cure of the silicone composition. Most preferably, the photocuring radiation comprises ultraviolet (UV) radiation.

Curing may suitably be carried out in an ambient atmosphere or in an inert atmosphere such as argon or nitrogen. Exposure time required to cure the applied composition varies with such factors as the particular formulation used, type and wavelength of radiation, energy flux, concentration of photoinitiator, and thickness of the coating, but it is generally quite short, that is, less than about 3 minutes. Exposing the composition to excessive amounts of radiation may "overcure" the composition, resulting in poor physical and performance properties. The amount of radiation which is excessive varies with the given formulation, coating thickness, radiation source, etc., and may easily be determined by the skilled artisan without undue experimentation.

The depth of radiation penetration in the silicone composition will depend on the constituents, fillers, and other compositional factors. Generally, in filled silicone compositions, the depth of radiation penetration is on the order of about 120 mils when ultraviolet light is used as the radiant medium.

In some instances, it may be feasible to photocure the silicone composition without any constituent photoinitiator to initiate the curing of the acryloxy-functional capped silicone, by substantial polymerization thereof.

In the preferred synthesis of the acryloxy-functional silicone employed in the broad practice of the invention, the following sequence of reaction steps is carried out:

(a) reacting (i) an acrylic acid compound of the formula:

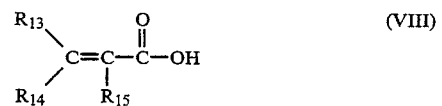

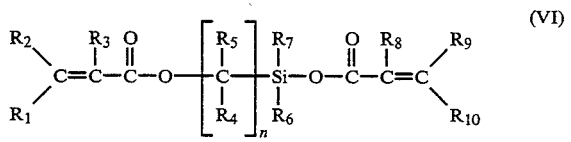

wherein: $R_{13}$, $R_{14}$, and $R_{15}$ are independently selected from hydrogen, halo, and organo radicals, with (ii) a chlorosilane compound of the formula:

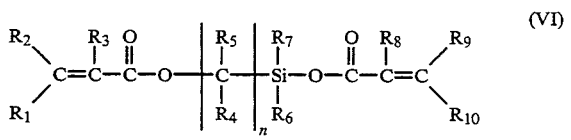

wherein
$R_4$, $R_5$, $R_6$, $R_7$ are independently selected from hydrogen, halo, and organo radicals, and
n is an integer of from 1 to 4;
in the presence of (iii) a basic hydrogen chloride acceptor, to yield a silyl diacrylate compound of the formula:

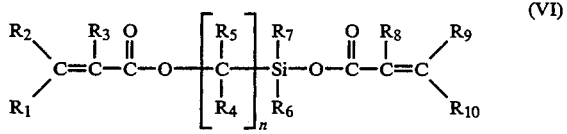

(VI)

wherein: $R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4; and (b) reacting the silyl diacrylate compound with a silicone having at least one functionality which is reactive with an acryloxy functionality of the silyl diacrylate compound, to yield an acryloxy-functional capped silicone as the silicone product.

In the embodiment of the invention producing a gel system the silyl diacrylate compound is reacted with a silicone having functionality which is reactive with an acryloxy functionality of the silyl diacrylate compound, to thereby cap the silicone with acryloxy functionality. The silicone also is reacted with a second silane to functionalize the silicone with inert (non-polymerizable) functionality. These respective capping steps may be carried out concurrently or in any suitable sequence to yield the capped polyfunctional silicone as product.

It will be appreciated that the acrylic acid component employed in the above-described reaction may comprise a mixture of compounds each of the general formula (VIii), e.g., a mixture of acrylic acid and methacrylic acid. Likewise, the chlorosilane co-reactant may be a mixture of chlorosilane species each of the general formula (IX) above, e.g., a mixture of chloromethyldimethylchlorosilane and chloromethyldiphenylchlorosilane. In such instance, the product silyl diacrylate will likewise comprise a mixture of correspondingly differently substituted silyl diacrylate compound species.

It may also be desirable in some instances to carry out the acrylic acid/chlorosilane reaction so as to form a difunctional capper containing both acryloxy functionality and other, "inert" functionality. For example, the reaction may be carried out using a mixture of acrylic acid and acetic acid for reaction with the chlorosilane, whereby the reaction product will include diacrylate capper of the general formula (VI) above, as well as capper compounds containing two acetoxy functionalities in the same molecule. In this manner, it is possible to use the reaction product silane cappers in mixture with one another to poly- functionalize the silicone in accordance with this embodiment of the present invention.

The acetoxy-functional silane compound which is described hereinabove as a preferred inert (second silane) capper species in the practice of the present invention, may suitably be synthesized in a manner analogous to the synthesis of the acrylic-functional capper, with the use of acetic acid in place of acrylic acid in the synthesis methodology described herein for the acrylic capper. Other carboxylic acids could also be used, in lieu of acetic acid, to produce other inert (second silane) capper species.

Generally, and preferably, the reaction of the acrylic acid compound(s) and the chlorosilane compound(s) is conducted in a diluent medium, preferably a non-reactant hydrocarbon or halohydrocarbon medium, e.g., heptane. Generally, and preferably, the reaction volume is stirred during the reaction, such as may be accommodated by the provision of mechanical mixing means in the reaction vessel.

In carrying out the reaction of the acrylic acid compound(s) with the chlorosilane compounds, it is generally advantageous to use a base such as triethylamine to function as a hydrogen chloride acceptor, thereby removing the hydrogen chloride formed in the reaction. In some instances, it may be feasible to remove the hydrogen chloride by-product by sparging the reaction mixture with nitrogen, whereby the passage of nitrogen through the mixture removes the hydrogen chloride.

The reaction may be carried out at any suitable temperature; generally, temperatures on the order of from about 25° C. to about 100° C. are usefully employed, and preferably from about 25° C. to about the reflux temperature of the diluent medium in which the reaction is carried out, e.g., about 100° C. for heptane as the diluent medium. The time required to carry out the reaction may be readily determined for a given reaction system by simple analytical tests without undue experimentation, and the reaction time may be varied as necessary or desirable in a given application. By way of example, the reaction may be carried out in approximately 3–4 hours in a diluent medium of heptane at reflux temperatures. After the reaction has been carried out, the reaction mixture may optionally be subjected to vacuum stripping or other suitable treatment for removal of residual acrylic acid from the reaction mixture, as and to the extent desired.

It will be appreciated that the synthesis methodology of the present invention achieves a substantial advanced in the art over the prior art practice of capping the silicone by reacting it with an isomeric mixture of acryloxypropenyldimethylchlorosilanes, as described hereinabove in the "Background of the Invention" section hereof. In the prior art synthesis, the generation of hydrochloric acid necessitates the addition of an amine in the process to function as the acid acceptor, resulting in a complexed amine hydrochloride solid which then must be filtered from the viscous capped silicone polymer, a step which is time-consuming, difficult, and costly.

By contrast, in the practice of the present invention, the synthesis of the capper per se is associated with the generation of hydrogen chloride, which then can be base amine complexed in the reaction mixture. Accordingly, whereas filtration of the capped polymer is required by the prior art synthesis method, the amine-complexed hydrogen chloride solid in the practice of the present invention is readily removable by filtration from the relatively low viscosity capper material, before the capper is reacted with the silicone, thereby achieving a significant advantage over the prior art methodology, in terms of processing time, ease of synthesis, and cost of the capped silicone product.

It will also be appreciated that the specific reaction scheme described above for capping a silicone by reaction with a silyl diacrylate compound, is an aspect of a capping methodology which may be broadly applied in the capping of silicones with other capping species, utilizing a carboxyl functional capper precursor which is reactive with a chlorosilane compound to yield the desired capper.

Thus, the present invention comprehends a method of capping a silicone having a cappable moiety in its structure, comprising the steps of:

(i) reacting a carboxyl functional capper precursor with a chlorosilane compound to yield as a reaction product a silyl capper compound which is cappingly reactive with the cappable moiety of the silicone; and (ii) reacting the silyl capper compound with the capable moiety of the silicone to yield a capped silicone product.

The above-described broad capping methodology may for example be used to impart acetoxy functionality to a silicone, by reacting acetic acid with a dichlorosilane compound to yield as reaction product a diacetoxysilane. This resulting capper compound can be reacted with a silicone containing interior, terminal and/or pendant hydroxyl functionality (or other labile hydrogen-containing functionality) to yield an acetoxy-functionalized silicone which is believed to be an inert (non-reactive) siloxane. Other suitable carboxyl functional capper precursors may be employed to yield silyl cappers of desired functionality which in turn may be employed to correspondingly functionalize the silicone, in order to impart a desired cure modality thereto, or otherwise to appropriately functionalize the silicone for its intended purpose.

The features and advantages of the present invention are more fully illustrated by the following non-limiting examples, wherein all parts and percentages are by weight, unless otherwise expressly stated.

EXAMPLE 1

A 12 liter three neck round bottom flask equipped with a mechanical stirrer, and a condenser, was charged with 7.5 liters of heptane. 720 ml acrylic acid, 1900 ml triethylamine and 616 g of chloromethyldimethylchlorosilane then was sequentially added to the heptane solution under nitrogen atmosphere. The mixture was stirred at 100° C. for 5 hours and then filtered and stripped to give 929 g of the crude acryloxymethyldimethylacryloxysilane. GC analysis indicated the crude materials had a high purity of >90%. The crude product can be further vacuum distilled at 0.5 mmHg and −70° C. to improve its purity, if necessary.

EXAMPLES 2–8

Samples of acryloxymethyldimethylacryloxysilane prepared in accordance with the procedure of Example 1 were mixed in various ratios with a hydroxy-ended polydimethylsiloxane having a viscosity of 2000 cps., at room temperature for 15 minutes. To each mixed sample was further added 1.5 (w/w) diethoxyacetophenone. The mixtures then were cast as 75 mil films and irradiated for one minute per side with 70 mW/cm$^2$ UV radiation using a medium pressure mercury vapor lamp. The hardness values of the photocured films then were determined using a Shore 00 Durometer. Results are shown in Table I below, including the equivalents ratio of acryloxy functionality to acryloxy-reactive functionality in each sample.

TABLE I

| Example | Wt. of Capper (Example I) | Wt. of Silicone | Shore 00 Durometer Hardness | Equivalents Ratio |
| --- | --- | --- | --- | --- |
| Example 2 | 1.8 g | 150 g | No Cure | 0.5 |
| Example 3 | 2.7 | 150 g | 28 | 0.75 |
| Example 4 | 3.6 g | 150 g | 57 | 1.0 |
| Example 5 | 4.5 g | 150 g | 61 | 1.25 |
| Example 6 | 5.4 g | 150 g | 75 | 1.50 |
| Example 7 | 6.3 g | 150 g | 76 | 1.75 |
| Example 8 | 7.2 g | 150 g | 76 | 2.0 |

EXAMPLES 9–11

Samples of the acryloxymethyldimethylacryloxysilane capper of Example 1 were mixed in various ratios at room temperature for 5 minutes with a hydroxyl-ended polydimethylsiloxane having a viscosity of 3500 cps. The mixtures then were vacuum stripped at 100° C. for 30 minutes. Thirty-two percent (w/w) of a surface treated hydrophobic fumed silica (surface area = 150 m$^2$/g) then was added to each of the mixtures and the mixtures were further mixed at room temperature for 15 minutes. To each of the mixtures was further added 1.5% diethoxyacetophenone, with 10 minutes additional mixing. The mixtures then were cast as 75 mil films and irradiated with 70 mW/cm$^2$ UV light using a medium pressure mercury vapor lamp The hardness, tensile strength, and elongation of the cured elastomers were determined. Results are shown in Table II below.

TABLE II

| Example | Wt. of Capper (Example I) | Wt. of Silicone | Wt. of Silica | Durometer Shore A Hardness | Tensile Strength (PSI) | Elongation (%) |
| --- | --- | --- | --- | --- | --- | --- |
| Example 9 | 3.10 g | 150 g | 48 g | 24 | 591 | 391 |
| Example 10 | 3.60 g | 150 g | 48 g | 24 | 786 | 359 |
| Example 11 | 4.10 g | 150 g | 48 g | 24 | 878 | 333 |

EXAMPLE 12

Example 1 was repeated but using methacrylic acid instead. Thus, in a 1000 ml round bottom flask, 600 ml of heptane, 20 ml of methacrylic acid, and 35 ml of triethylamine were sequentially added with stirring. To this mixture was further added 14.3 g chloromethyldimethylchlorosilane. The mixture then was heated to 100° C. for 4 hours. The mixture was cooled and filtered to remove the triethylamine hydrochloride salt and stripped to remove the solvent and yield 35 g of a crude yellowish liquid. Fifteen grams of this crude liquid were added to 150 g of hydroxyl-ended polydimethylsiloxane with a viscosity of 3500 cps. The mixture was stirred and then stripped at 60° C., 0.5 mm Hg for one hour. One percent (w/w) of diethoxyacetophenone was added to this mixture, and a 75 mil film was cast. The film was irradiated with a 70 mW/cm$^2$ UV light for 2 minutes per side using a medium pressure mercury lamp. The film photocured to an elastomer with a hardness of 62 as measured by Shore (00) Durometer.

EXAMPLE 13

The formulations of sealants shown in Table III below were made up, in which Sealant A and Sealant B were of identical composition except for the acrylic functionality-capped silicones therein. Sealant A employed a silicone polymer (Polymer A) which was formed by reacting a 28,000 weight average molecular weight hydroxy-terminated polydimethylsiloxane with an isomeric mixture of acryloxypropenyldimethylchlorosilane of formulas (I) and (11) described hereinabove, in a weight ratio of 75–80% (I) to 25–20% (111). Sealant B employed a silicone polymer (Polymer B) which was formed by reacting a hydroxy-terminated 28,000 weight average molecular weight polydimethylsiloxane with a capper of formula (VI), acryloxymethyldimethylacryloxychlorosilane, in accordance with the present invention. Both silicone polymers were fully capped, as shown by the absence of any detectable free silanol (SiOH) functionality.

TABLE III

|  | Sealant A | Sealant B |
| --- | --- | --- |
| Polymer | Polymer A | Polymer B |
|  | 3.50 kg | 3.50 kg |
|  | 75.0% | 75.0% |
| Fumed Silica | 1.10 kg | 1.10 kg |
|  | 23.5% | 23.5% |
| Diethoxyacetophenone | 71.2 g | 71.2 g |
| (DEAP) photoinitiator | 1.5% | 1.5% |
| Stabilizer[a] | 1.50 g | 1.50 g |
|  | 0.03% | 0.03% |
| Total | 4.67 kg | 4.67 kg |

[a]1:1 50% BHT in toluene:50% MEHQ in IPA

The silicone fluid used to prepare Polymer A and Polymer B was Mazer Masil$^{TM\ TM\ SFR}$ 3500 cps hydroxy terminated polydimethylsiloxane silicone fluid. The fumed silica filler was Wacker HDK-2000 treated fumed silica. The photoinitiator was Upjohn diethoxyacetophenone (DEAP). The stabilizers used in these sealant formulations were Eastman Kodak 4-methoxyphenol (MEHQ) and Eastman Kodak 4-methyl-2,6-di-t-butylphenol (BHT).

The capper which was used to prepare the capped silicone polymer for Sealant B was made by the following procedure. 143 g (1.0 mole) of chloromethyldimethylchlorosilane (Petrarch Systems) was reacted with a mixture of 150 g (2.1 moles) acrylic acid (Aldrich 99% grade) and 215 g (2.13 moles) triethylamine (Aldrich 99% grade) to 1000 g n-heptane (J. T. Baker) at reflux for 4 hours. Heptane, acrylic acid, and triethylamine were first added to a round bottom flask with a mechanical stirrer, nitrogen bubbler, condenser, and heating mantle. The chloromethyldimethysilane then was added to the flask. The reaction mixture was stirred for 4 hours at reflux. The product mixture then was cooled and filtered to remove the triethylamine hydrochloride. Solvents were removed by distillation under reduced pressure.

The reaction yield is essentially quantitative but the actual yield depends much upon the amount of product loss during filtration and stripping. The product capper, acryloxymethyldimethylacryloxysilane, is very reactive with water. It should be stored in a tightly sealed glass container. Although quite stable at room temperature, the capper may advantageously be refrigerated to ensure shelf-life. Acrylate polymerization inhibitor such as 400 ppm 4-methoxyphenol (MEHQ) is desirably added to the capper.

Polymer B was prepared by mixing 3500 cps hydroxy silicone fluids with the acryloxymethyldimethylacryloxysilane capper. The molar excess of capper is 0% based on the assumed 28,000 molecular weight of the silicone fluid (71 μeq) or 545 based on molecular weight derived from FTIR silanol analysis (46 μeq). Although heat is not necessarily required during the capping reaction it is generally desirable to ensure full end-capping.

The capped silicone product was heated for 3 hours under vacuum (1 mm Hg). The resulting capped silicone was then wipe film evaporated with two passes to remove most of the low molecular weight components.

Polymer A was made by an analogous procedure, using an isomeric mixture of compounds of formulae (I) and (11) as the capping species.

The sealants, Sealant A and Sealant B, were made in a Jaygo Mixer using the same batch size as well as heating, mixing, and vacuum conditions in both cases. The capped silicone fluid in each case was charged to the mixer kettle, and fumed silica was added. After the "wetting" of the fumed silica, the batch was mixed for two hours under vacuum while full steam was applied to the kettle jacket. The batch then was cooled, and the remaining ingredients were added. After a short, gentle mixing under vacuum, the batch was transferred into cartridges. Slabs of sealant were placed in a 5×5"×0.075" steel frame between a 1 mm polyethylene sheet and then two 174" glass plates. The samples were secured with clamps and then exposed to 75 mW/cm$^2$ light (medium pressure mercury lamp) for one minute on each side to effect curing thereof. The following physical properties of the cured materials were determined: durometer (Shore A hardness), tensile, strength, elongation, and modulus at 100% and 200% elongation. The results are shown in Table IV below. The tabulated values for tensile strength, % elongation, and modulus are median values based on measurement of five samples in each instance.

TABLE IV

|  | Sealant A | Sealant B |
| --- | --- | --- |
| Durometer, Shore A Harness | 34 | 36 |
| Tensile strength, psi | 454 | 689 |
| % Elongation | 277 | 310 |
| Modulus @ 100% Elongation | 116 | 144 |
| Modulus @ 200% Elongation | 279 | 359 |
| Hexane Extractables, % | 4.5 | 4.2 |

The above results indicate that while both Sealant A and Sealant B yield good initial cured properties. Sealant B was clearly superior to Sealant A.

EXAMPLE 14

To 60 g of hydroxy-terminated polymethylphenylsiloxane (viscosity =2400 cps; Baysilone polymer 3176) was added 2.2 g acryloxymethyldimethylacryloxysilane and 0.6 g diethoxyacetophenone at room temperatures. The mixture was stirred for 30 seconds and de-aired for 5 minutes. The mixture then was cast in a 75 mil thickness film and irradiated in a medium pressure mercury vapor UV chamber for 1 minute per side with a 70 mW/cm$^2$ UV intensity. The material cured to an elastomer having a Shore (00) durometer hardness of 62.

In general, the capped silicone compositions of the present invention displayed excellent cured characteristics, and also exhibited superior performance results in a variety of evaluation tests, including humidity aging, heat aging, oil immersion, and antifreeze immersion, both initially and after extended exposure to the test conditions.

EXAMPLE 15

Acryloxymethyldimethylacryloxysilane was prepared in accordance with the procedure of Example 1, and acetoxymethyldimethylacetoxysilane was prepared by the same procedure using acetic acid in place of acrylic acid.

Acryloxymethyldimethylacryloxysilane (5.76 g) and acetoxymethyldimethylacetoxysilane (468 g; viscosity=2,000 cps) at room temperature. The mixture was heated to 60° C. for one hour. Methanol (8.06 g) then was added. The mixture was further stirred at 60° C. or one hour, following which the mixture was vacuum stripped to remove all volatile materials therefrom. The resulting material was mixed with photoinitiator and UV cured to produce a soft gel, which was too soft to measure its hardness using a durometer gauge.

EXAMPLE 16

To 60 g of hydroxy-terminated polymethylphenylsiloxane (viscosity=2400 cps; Baysilone Polymer 37176) was added 2.2 g acryloxymethyldimethylacryloxysilane and 0.6 g diethoxyacetophenone at room temperature. The mixture was stirred for 30 seconds and de-aired for 5 minutes. The mixture then was cast in 75 mil thickness film and irradiated in a medium pressure mercury vapor UV chamber for 1 minute per side with a 70 mW/cm$^2$ UV intensity. The material cured to an elastomer having a Shore (00) durometer hardness of 62.

EXAMPLE 17

For comparison purposes, silanol-terminated polydimethylsiloxane of the type used in Example 15 was fully capped with acryyloxymethyldimethylacryloxysilane (prepared in accordance with the procedure of Example 1). Following UV cure, this fully endcapped material had a durometer (00) reading of 75.

The foregoing examples show that the silyl diacrylate compound is an effective capper for imparting UV radiation curable character to a silanol-terminated silicone, and that when used in combination with acetoxymethyldimethylacetoxysilane as an inert capper, as in Example 15, the resulting capped silicone when photocured under UV radiation yielded a soft gel product. By contrast, a substantially hard, tough material was produced by completely capping a corresponding silicone with only the acrylic capper (Example 17).

EXAMPLE 18

Acryloxymethyldimethylacryloxysilane was prepared in accordance with the general procedure of Example 1, but with the reaction product having an estimated purity of 70% of silyl diacrylate capper therein.

To 50 g of silanol-terminated polydimethylsiloxane (viscosity=3500 cps), the following materials were sequentially added and mixed at room temperature.
 5.5 g of the silyl diacrylate capper;
 (2) 8.6 g of ethyltriacetoxysilane; and
 (3) 2.5 g of diethoxyacetophenone.

The resulting mixture, after de-airing, was photocured under a Fusion lamp using a H-bulb to give a soft gel, too soft to measure its hardness. After standing at ambient temperature for 1.5 hours, the material gave a durometer (00) reading of 35. After three hours, the hardness was 54, and after standing overnight the hardness increased to 65.

EXAMPLE 19

A silicone composition was made up in accordance with the procedure of Example 18. The uncured mixture when left in ambient condition formed a soft gel in 30 minutes. After standing overnight, the mixture cured to a soft rubber with a hardness value of 13 (durometer (00)). The soft rubber was further UV cured under the Fusion Lamp to a hardness of 69.

The foregoing examples 18 and 19 show that the silyl diacrylate compound was an effective capper for imparting UV radiation curable character to the silanol-terminated silicone, and the ethyltriacetoxysilane capped the residual silanol functionality of the silicone to impart moisture curability to the polymer. In this manner, a silicone polyfunctionalized for UV and moisture curing was produced, and the resulting composition was effectively cured by initial radiation curing and final ambient moisture curing (Example 18), as well as by ambient moisture curing followed by UV radiation curing (Example 19).

What is claimed is:
1. A silicone:
   (i) capped, by a non-hydrolysis capping reaction, with acryloxy functional moieties of a silyl diacrylate caper of the formula:

$$\begin{array}{c}R_2\\ \diagdown\\ R_1\end{array}\!\!C\!=\!\!\underset{\underset{R_3}{|}}{C}\!-\!\underset{\underset{}{\overset{O}{\|}}}{C}\!-\!O\!-\!\!\left(\!\underset{\underset{R_4}{|}}{\overset{R_5}{\underset{|}{C}}}\!\right)_{\!\!n}\!\!\underset{\underset{R_6}{|}}{\overset{R_7}{\underset{|}{Si}}}\!-\!O\!-\!\underset{\underset{}{\overset{O}{\|}}}{C}\!-\!\underset{\underset{}{\overset{R_8}{|}}}{C}\!=\!C\!\begin{array}{c}\diagup R_9\\ \\ \diagdown R_{10}\end{array}$$

wherein:
$R_1$, $R_2$, $R_3$, $R_4$, $R_5$, $R_6 R_7$, $R_8$, $R_9$, and $R_{10}$ are independently selected from hydrogen, halo, and organo radicals; and n is an integer having a value of from 1 to 4;
whereby said silicone is partially curable under radiation exposure conditions curingly effective therefor, optionally including the presence therewith of a photoinitiator, and
(ii) having additional functionality imparting to the silicone at least one partial curing modality different from the partially curingly effective radiation exposure conditions constituting a first partial curing modality therefor, or
being present with another material which is curable by curing conditions other than actinic radiation exposure curingly effective for the silicone by virtue of the acryloxy-functional moieties thereof.

2. A silicone according to claim 1, of the formula:

$$\begin{array}{c}(R)_a\\ \diagdown\\ (X)_b\end{array}\!Si\!-\!O\!\!\left(\!\underset{\underset{X}{|}}{\overset{R}{\underset{|}{Si}}}\!-\!O\!\right)_{\!\!s}\!\!\left(\!\underset{\underset{R}{|}}{\overset{R}{\underset{|}{Si}}}\!-\!O\!\right)_{\!\!t}\!Si\!\begin{array}{c}\diagup (R)_c\\ \\ \diagdown (X)_d\end{array}$$

wherein:
each R is independently selected from the group consisting of hydrogen, halo, and organo radicals;
each X is independently:
   (i) an acryloxy-functional capping moiety derived from said silyl diacrylate capper and imparting actinic radiation exposure curability, optionally in the presence of a photoinitiator, to the silicone, or
   (ii) an additional function moiety imparting to the silicone another cure modality differing form its actinic radiation exposure curability by virtue of acryloxy-functional moieties thereof;

each of a,b,c, and d is independently 0, 1, 2, or 3;

s is 0 or a positive integer; and t is a positive integer;

provided that:

$(a+b)=(c+d)=3$;

$(b+d+s)$ is greater than or equal to 2; and the equivalents ratio of acryloxysilyl functionality to said additional functionality (ii) is selected from the group consisting of:

(A) an equivalents ratio of from 0.1:0.9 to 0.8:0.2; and (B) 0.1:0.9 to 1.0:0.0, when the silicone is present with another material which is curable by curing conditions other than actinic radiation exposure curingly effective for the silicone by virtue of the acryloxy-functional moieties thereof.

3. A silicone according to claim 2, wherein each R is independently selected from $C_1$-$C_8$ alkyl, and phenyl.

4. A silicone according to claim 2, wherein each R is methyl.

5. A silicone according to claim 2, wherein s is less than 20.

6. A silicone according to claim 2, wherein s is less than 8.

7. A photocurable composition comprising a silicone according to claim 2, and a photoinitiator.

8. A photocured product formed by exposure of the photocurable composition of claim 7 to radiation exposure conditions curingly effective therefor.

9. A cured silicone formed by subjecting the photocured silicone composition of claim 8 to additional curing conditions further curingly effective therefor to produce a fully cured silicone composition.

10. A silicone according to claim 1, comprising a photocurable silicone gel composition formed as a reaction product of:

(a) a first silane of the formula:

$$R_2 \atop R_1 \!\!\!\diagdown \!\!\!\!\diagup \!\!\!C\!=\!C\!-\!\underset{\underset{R_3}{|}}{C}\!-\!\overset{\overset{O}{\|}}{}\!-\!O\!-\!\!\left[\!\underset{\underset{R_4}{|}}{\overset{\overset{R_5}{|}}{C}}\!\right]_n\!\!-\!\underset{\underset{R_6}{|}}{\overset{\overset{R_7}{|}}{Si}}\!-\!O\!-\!\overset{\overset{O}{\|}}{C}\!-\!\underset{\underset{R_{10}}{\diagdown}}{\overset{\overset{R_8}{|}}{C}}\!=\!C\!\!\!\diagup\!\!\!\!\diagdown\!\!\!R_9$$

wherein:

$R_1$, $R_2$, $R_3$, $R_4$, $R_5$, $R_6$, $R_7$, $R_8$, $R_9$, and $R_{10}$ are independently selected from hydrogen, halo, and organo radicals; and n is an integer having a value of from 1 to 4;

(b) a second silane of the formula:

$$R_{11}\!-\!\overset{\overset{O}{\|}}{C}\!-\!O\!-\!\!\left[\!\underset{\underset{R_{12}}{|}}{\overset{\overset{R_{13}}{|}}{C}}\!\right]_n\!\!-\!\underset{\underset{R_{14}}{|}}{\overset{\overset{R_{15}}{|}}{Si}}\!-\!O\!-\!\overset{\overset{O}{\|}}{C}\!-\!R_{16}$$

wherein:

$R_{11}$ and $R_{16}$ are non-polymerizable groups and are independently selected from halo and organo radicals;

$R_{12}$, $R_{13}$, $R_{14}$, and $R_{15}$ are independently selected from hydrogen, halo, and organo radicals; and n is an integer having a value of from 1 to 4; and (c) a polysiloxane having at least two functional groups per molecule with which said first and second silanes are cappingly and non-hydrolyzingly reactive;

wherein: (1) the first and second silanes together are provided in sufficient quantity relative to said polysiloxane to non-hydrolyzingly react with substantially all of the cappingly reactive functional groups of the polysiloxane, and (2) the first silane constitutes from about 50% to about 98% by weight of the total weight of the first and second silanes.

11. A composition according to claim 10, wherein the reaction is carried out at a temperature of from about 0° C. to about 100° C.

12. A composition according to claim 10, wherein the reaction is carried out at room temperature.

13. A composition comprising a photocurable silicone gel composition according to claim 10, and an effective amount of a photoinitiator for curing of said photocurable silicone gel composition under radiation exposure curing conditions.

14. A composition according to claim 13, wherein the photoinitiator comprises a material selected from the group consisting of benzophenone, benzoin, acetophenone, benzil, and their substituted forms, and mixtures thereof.

15. A composition according to claim 13, wherein the photoinitiator comprises diethoxyacetophenone.

16. A composition according to claim 13, further comprising a filler.

* * * * *

UNITED STATES PATENT AND TRADEMARK OFFICE
CERTIFICATE OF CORRECTION

PATENT NO. : 5,348,986
DATED : September 20, 1994
INVENTOR(S) : Hsien-Kun Chu, et al.

It is certified that error appears in the above-indentified patent and that said Letters Patent is hereby corrected as shown below:

In Column 34, Line 22, "caper" should read -- capper --.

In Column 34, Line 32, "$R_6R_7$," should read -- $R_6$, $R_7$, --.

In Column 34, Line 68, "form" should read -- from --.

Signed and Sealed this

Eighth Day of November, 1994

Attest:

BRUCE LEHMAN

Attesting Officer  Commissioner of Patents and Trademarks